United States Patent

Sakamoto et al.

[11] Patent Number: 5,591,542
[45] Date of Patent: Jan. 7, 1997

[54] BATTERY DIAPHRAGM AND BATTERY WITH SUCH A DIAPHRAGM

[75] Inventors: Takeshi Sakamoto; Koji Hara; Akira Harada, all of Osaka, Japan

[73] Assignee: Sumitomo Electric Industries, Ltd., Osaka, Japan

[21] Appl. No.: 313,268

[22] PCT Filed: Feb. 8, 1994

[86] PCT No.: PCT/JP94/00182

§ 371 Date: Sep. 30, 1994

§ 102(e) Date: Sep. 30, 1994

[87] PCT Pub. No.: WO94/18711

PCT Pub. Date: Aug. 18, 1994

[30] Foreign Application Priority Data

Feb. 9, 1993 [JP] Japan .................................. 5-021130

[51] Int. Cl.⁶ .................................................. H01M 6/18
[52] U.S. Cl. .......................... 429/192; 429/249; 429/254; 204/157.15; 521/50.5; 521/50; 521/905; 522/2; 526/252; 526/255; 428/411.1
[58] Field of Search .................... 429/192, 249, 429/254; 204/157.15, 157.6, 157.63; 521/50, 50.5, 905; 522/2; 526/252, 255; 428/411.1

[56] References Cited

FOREIGN PATENT DOCUMENTS

| | | |
|---|---|---|
| 3062449 | 3/1991 | Japan . |
| 3059947 | 3/1991 | Japan . |
| 3283259 | 12/1991 | Japan . |
| 3291848 | 12/1991 | Japan . |
| WO9119326 | 12/1991 | WIPO . |

*Primary Examiner*—Kathryn Gorgos
*Attorney, Agent, or Firm*—W. G. Fasse; W. F. Fasse

[57] ABSTRACT

A battery having a positive electrode, a negative electrode is equipped with a diaphragm between the electrodes. The diaphragm includes a hydrophilized polymer porous body with pores in which ethylene copolymer particles are held, having a melting point of 80° to 170° C., and side chains.

37 Claims, 5 Drawing Sheets

BATTERY DIAPHRAGM AND BATTERY WITH SUCH A DIAPHRAGM

FIELD OF THE INVENTION

This is a 371 of PCT/JP94/00182 filed Feb. 8, 1994, and published as WO94/18711 Aug. 18, 1994.

The present invention relates to a battery or separator diaphragm and a battery, and more particularly, it relates to a battery with such a diaphragm which has excellent battery characteristics and safety features. The terms "diaphragm" and separator are used as synonyms herein.

Background Information

In recent years, capacities and outputs of batteries have been increased in primary and secondary batteries such as an alkaline manganese battery, a nickel-cadmium battery, a nickel-hydrogen battery, and a lithium battery. The range of use for such batteries has been greatly widened.

However, a safety hazard in an abnormal battery state has been highlighted. Particularly in the lithium battery which is widely applied in electronics or the like, the temperature of the battery may abruptly rise and thereby increase the internal pressure if an overcharge or an external short circuit that is caused by improper handling, leading to spouting of the electrolyte.

In order to prevent occurrence of an abnormal state caused by such an external short or the like, a method has been studied for increasing the resistance of a diaphragm for suppressing a short-circuit current, thereby inhibiting heat generation. As a concrete example of such a method, there has been developed a technique of insulating the diaphragm at a temperature of not more than 180° C., which is the melting point of lithium. Such insulating greatly increases the internal resistance of the battery, thereby suppressing a short-circuit current and inhibiting heat generation as described below, for example.

Japanese Patent Publication No. 5-16139 (Japanese Patent Laying-Open No. 60-52) discloses a diaphragm consisting of polypropylene nonwoven fabric having a surface which has been impregnated with polyethylene fine powder. When a battery employing such a diaphragm is heated, polyethylene is melted to block pores of the diaphragm. Consequently, the ion permeability of the diaphragm is extremely reduced, whereby a temperature rise in the battery is suppressed.

On the other hand, Japanese Patent Laying-Open No. 3-283259 discloses a battery employing a diaphragm comprising a synthetic resin fine porous film having at least one surface covered with a polymer powder aggregate such as a polyethylene powder aggregate, for example, having a softening temperature of 95° to 160° C.

Further, Japanese Patent Laying-Open No. 3-291848 also discloses a battery employing a diaphragm comprising a synthetic resin fine porous film which is covered with a resin porous powder aggregate. This powder aggregate has a softening point of 95° to 160° C., and contains 1 to 50 wt. % of particles of 0.01 to 1 µm in particle size.

In addition to such a diaphragm carrying resin particles, a diaphragm of a multilayer structure consisting of a first layer which enters a non-porous state at 80° to 150° C. and a second layer maintaining its shape at a temperature which is 10° C. higher than 150° C. is disclosed in Japanese Patent Publication No. 4-38101, for example.

In addition, a lithium battery employing a polyolefin porous film as the diaphragm is also developed. When a short-circuit test is made as to this battery, pores are blocked by shape change of the diaphragm. Consequently, ion permeability of the diaphragm is remarkably reduced and temperature rise of the battery is suppressed.

However, it has been found that the aforementioned conventional safety features have the following problems, although the good effects thereof are certainly recognized:

Namely, in the lithium battery employing a polyolefin porous film as the diaphragm, for example, a temperature rise is suppressed by a shape change of the diaphragm in a short-circuit test. However, heating may be caused anyway since the diaphragm may be broken due to a reduction in strength when a base material of which the diaphragm itself is made undergoes a shape-change to cause an internal short.

When the battery employing a diaphragm consisting of polypropylene nonwoven fabric having a surface which has been previously impregnated with polyethylene fine powder, is heated, the polyethylene is melted and the ion permeability of the diaphragm is remarkably reduced as described above. Moreover, however, the pore size in the nonwoven fabric diaphragm is so large that the pores cannot be completely blocked. Further, safety is reduced because over time the insulation becomes so insufficient that the insulated state is not necessarily maintained until the battery is cooled, and hence, the temperature is not reduced in the interior of the battery which causes a problem in practice.

In order to improve safety even if the battery is in an abnormal state, the above methods of insulating the diaphragm for increasing the internal resistance of the battery have been considered. However, in a nonaqueous electrolytic battery such as a lithium battery, it is important to reduce the internal resistance in order to improve the battery performance, particularly the energy efficiency and the boosting charge/discharge characteristics.

In this connection, the polyethylene powder is disadvantageously dissolved in the electrolyte during long-term preservation in the battery according to the invention of Japanese Patent Laying-Open No. 3-283259, and the capacity deteriorates over time to such an extent that a high battery performance cannot be attained although the reason for this deterioration has not been clarified. Possibly resin particles are disadvantageously dissolved in the organic electrolyte over a long time period or due to a high temperature, and hence safety in an abnormal battery state cannot be ensured.

SUMMARY OF THE INVENTION

An object of the present invention is to provide a battery diaphragm and a battery, which can solve the aforementioned problems, maintain a high battery performance during normal use, and ensure safety in the abnormal state of a temperature rise caused by an external short circuit or the like.

Another object of the present invention is to provide a battery diaphragm and a battery, which can ensure safety in an abnormal state even for prolonged periods of time.

A battery diaphragm according to the present invention includes a hydrophilized polymer porous body and polymer particles having a melting point of 80° to 170° C. including ethylene copolymer particles having side chains, and the polymer particles are carried on the polymer porous body.

Throughout the specification, the term "side chains" refers carbon chains which are branched from a principal chain in a chain compound, and include all carbon chains having a carbon number of at least 2, in addition to carbon chains having a carbon number of 1 such as those of a methyl group and a carboxyl group, for example.

Preferably, the particle size of the polymer particles is in excess of the pore size of the hydrophilized porous body, and the polymer particles are carried on the polymer porous body in a layer thickness of at least 5 μm.

Preferably, the pore size of the hydrophilized polymer porous body is at least 0.01 μm.

Preferably, the ethylene copolymer is an ethylene-acrylic acid copolymer.

Preferably, the ethylene copolymer is an ethylene-α olefin copolymer.

Preferably, the polymer porous body is a tetrafluoroethylene drawn film.

The battery diaphragm according to the present invention preferably includes a hydrophilized tetrafluoroethylene drawn carrier film, and polymer particles including ethylene-acrylic acid copolymer particles carried on this film.

Further, the battery diaphragm according to the present invention preferably includes a hydrophilized tetrafluoroethylene drawn film, and polymer particles including ethylene-α olefin copolymer particles which are carried on this film.

Preferably, a bridging compound is contained on the polymer particles, between the polymer particles or in the polymer particles.

The bridgeable compound can be prepared from a peroxide, an azo compound, an amine, an imidazole, an isocyanate or the like, for example.

Preferably, the hydrophilized polymer porous body is obtained by fixing a hydrophilic polymer to a porous film by graft polymerization or coating.

A battery according to the present invention comprises a positive electrode, a negative electrode and a diaphragm, and the diaphragm preferably includes a hydrophilized tetrafluoroethylene drawn film, and polymer particles including ethylene-acrylic acid copolymer particles which are carried on this film.

In another embodiment the present battery includes a diaphragm which preferably includes a hydrophilized tetrafluoroethylene drawn carrier film, and polymer particles including ethylene-α olefin copolymer particles carried on this film.

In the battery employing the present diaphragm, pores of the porous carrier film are blocked by melting of the particles carried by the film in an abnormal state when a temperature rise has been caused by an external short or the like. Thus, the ion permeability between the positive electrode and the negative electrode is lost and the battery loses its function.

According to the present invention, particles of an ethylene copolymer including side chains are carried on a hydrophilized polymer porous body. The inventors have discovered that a battery employing such a diaphragm has a low internal resistance, withstands a severe charge or discharge, and has an excellent service life under normal operating conditions, while providing a high certainty of insulating or blocking pores of the polymer porous body. The blocking has an excellent stability over time after insulation took place in an abnormal state of an overcharge or an external short circuit, whereby excellent results are obtained in battery performance and safety performance.

When the battery diaphragm according to the present invention is heated in an abnormal state of an overcharge or external short circuit, the carried particles are melted and flow to block the pores of the hydrophilized polymer porous body, thereby insulating the diaphragm, whereby the electrolyte loses its ion permeability. Further, the ethylene copolymer including side chains safely continues the blocked state of the pores of the hydrophilized polymer porous body after the diaphragm according to the present invention is insulated by the melted particles, whereby it is possible to reliably ensure safety also in an abnormal state such as an external short circuit that maintains a relatively high temperature.

Further, the diaphragm or separator contains a bridging compound on the polymer particles, between the polymer particles or in the polymer particles. When in an abnormal state, the battery temperature increases, the polymer particles are melted and the bridging compound blocks the pores of the polymer porous body to prevent further flow through the diaphragm or separator. Consequently, insulation of the diaphragm is further stabilized in a high temperature state, whereby safety can be more reliably ensured.

According to the present invention, homopolymer particles and copolymer particles having different molecular weights can be simultaneously employed as needed.

The polymer porous body of the present invention can be made of a fine porous film having a network structure obtained by uniaxial orientation or biaxial orientation, for example.

Further, the material for making the porous body can be selected from polybutene, polyvinyl chloride, polyethylene terephthalate, nylon, polychlorotrifluoroethylene, polyvinylidene fluoride, tetrafluoroethylene or the like, or a mixture or a copolymer thereof. In particular, a drawn film of tetrafluoroethylene according to the present invention is one consisting of fibril having a high crystallinity and a homogeneous morphology, in which the pore size or porosity changes in the direction of thickness and knots of the fibril have long shapes in the direction of thickness.

Further, it is preferable that the porosity of the porous body is at least 30%, because the preservability of the electrolyte is reduced and the internal resistance is increased whereby the battery performance is reduced if the porosity is too small. If the porosity is too large, on the other hand, the strength of the porous body is so reduced that the diaphragm is not suitable for practical application. However, the upper limit of the porosity of the porous body cannot be univocally determined since the strength of the polymer porous body varies with the material of which the body is made.

Further, the energy density is increased as the film thickness of the polymer porous body is reduced since the electrode quantity can be increased in a battery of the same volume. Therefore, it is preferable that the film thickness of the porous body is not more than 50 μm. If the film thickness is too small, the diaphragm is not suitable for practical application since the mechanical strength is disadvantageously reduced. However, the lower limit of the film thickness cannot be determined since strength of the porous body is varied with the material of which the porous body is made.

Further, the pore size of the polymer porous body is preferably at least 0.01 μm because the internal resistance of the battery is increased by smaller pores, whereby a battery having excellent performance cannot be attained if the pore size is too small. On the other hand, the upper limit of the pore size of the diaphragm must be of a size that will not cause a short-circuit by materials forming the positive electrode and the negative electrode. However, the material forming the positive electrode is selected from $LiNiO_2$, $LiMnO_2$, $MnO_2$, $V_2O_5$, $TiS_2$, graphite fluoride or nickel oxyhydroxide in addition to $LiCoO_2$ or polyaniline, while the material for the negative electrode is selected from polyacene, an Li metal, CdO or a hydrogen absorbing alloy in addition to carbon or an Li—Al alloy, and types thereof are over a wide range. Further, the shapes and sizes of the electrodes will determine the upper pore size limit.

According to the present invention the polymer porous body is preferably hydrophilized. The method of hydrophilization of the porous body is not particularly restricted, but a discharge treatment, a treatment with a surface active agent, or fixation of a hydrophilic polymer to the polymer porous body by graft polymerization or coating is effective.

The discharge treatment is not particularly restricted, but plasma discharge treatment, corona discharge treatment, electron beam irradiation or gamma irradiation may be employed and it is possible to provide a hydrophilic functional group such as a carboxyl group or an amino group on the surface of the porous film.

The surface active agent is not particularly restricted, but an anion surface active agent (such as fatty acid soap, alkylbenzene sulfonate, alkylallyl sulfonate, alkylnaphthalene sulfonate or the like, for example), a cation surface active agent (such as alkylamine salt, amide linkage amine salt, ester linkage amine salt, alkylammonium salt, amide linkage ammonium salt, ester linkage ammonium salt, ether linkage ammonium salt, alkyl Pyridium salt or ester linkage Pyridinium salt, for example), a amphoteric surface active agent (such as long-chain alkylamino acid, for example), or a nonionic surface active agent (such as alkylallyl ether, alkylether, alkylamine fatty acid glycerol ester, anhydrosorbitol fatty acid ester or polyoxyethylene fatty acid amide, for example) is effective.

The method of fixing a hydrophilic polymer to the polymer porous body by graft polymerization is not particularly restricted, for example a method of impregnating the porous body in a water-soluble polymer (such as polyacrylic acid, polymethacrylic acid, polyvinyl alcohol or polyethylene imine, for example) and introducing a crosslinking agent (such as benzoyl peroxide, diazoaminobenzene, azochloroamide, azobisisobutyl nitrile, a halogen compound, formaldehyde, thiouric acid or isocyanate, for example), or a method of applying ionizing radiation (such as electron beam or gamma ray) is effective.

A method of coating a hydrophilic polymer is as follows:

The hydrophilic polymer is dissolved in a solvent in which the polymer porous body is insoluble and hydrophilic resin is soluble, and the polymer porous body is impregnated therein and thereafter dried to deposit the hydrophilic polymer on the surface of the polymer porous body. The hydrophilic polymer is not particularly restricted, but a copolymer of polyethylene and polyvinyl alcohol, or one into which a sulfonic group has been introduced is preferable. The solvent in which the polymer porous body is insoluble and the hydrophilic resin is soluble is not particularly restricted, but the same may be prepared from a mixed solution of water and propyl alcohol, for example.

The porous body is hardly provided in its interior with the hydrophilic functional group in the discharge treatment, among these hydrophilization methods. In the surface active agent treatment, a chemical change may be caused particularly during a by long-term useful life of the battery, whereby the battery performance may deteriorate. Therefore, the hydrophilization by fixation of the hydrophilic polymer to the polymer porous body is preferably employed.

In the present invention, the ethylene copolymer having side chains is not particularly restricted, but the same may be prepared from ethylene-ethyl acrylate (EEA), an ethylene-vinyl acetate copolymer (EVA), an ethylene-propylene copolymer (EPR), an ethylene-butene copolymer, an ethylene-isobutylene copolymer, an ethylene-dimethylpentene-1 copolymer, an ethylene-styrol copolymer, an ethylene-ester acrylate copolymer, an ethylene-vinyl alcohol copolymer or the like.

It is necessary to insulate the present diaphragm at 80° to 170° C. This is because ordinary employment and preservation of the present battery are carried out in an environment of not more than 80° C. and it is necessary to improve the safety in an abnormal state of the battery by preventing the battery from reaching 180° C., which is the melting point of a lithium metal.

According to the present invention, the method of applying the particles on the porous film is not particularly restricted. A filtering method or a method of applying the particles with a bar coater or a roller, or a method of incorporating the particles into a woven fabric or a non-woven fabric for lamination to the porous film. Surfaces of the particles which are carried on the film may be provided on a positive electrode side, a negative electrode side or both sides when forming a battery. As to the amount of particles carried on the porous film the particles preferably have a layer thickness of at least 5 μm, in order to attain a stable insulation performance. If the amount of particles is too large, however, the internal resistance of the battery employing this diaphragm is increased which is not desired.

In the present invention, further, the particle size of the ethylene copolymer particles must be in excess of the pore size of the hydrophilized polymer porous body. Otherwise the particles penetrate into the interior of the polymer porous body whereby the porosity of the polymer porous body is reduced, or the particles are dispersed on the porous film so that blocking of the pores is incomplete. As the particle size is increased, voids are so increased that the internal resistance is reduced particularly in the case of an organic electrolyte. The upper limit of the particle size is a value capable of implementing blocking of the polymer porous body. This upper limit particles size value depends on the thickness of layer of polymer particles carried on the porous body and on the material of the particles.

The present invention is not restricted to any particular type of battery but a primary or secondary battery such as an alkaline manganese battery, a nickel-cadmium battery, a nickel-hydrogen battery, a lithium battery, a lithium ion battery or a polymer battery can be employed, for example.

The present invention is now described with reference to Examples, the battery diaphragm and the battery according to the present invention are not restricted to the following Examples.

DETAILED DESCRIPTION OF PREFERRED EXAMPLE EMBODIMENTS AND OF THE BEST MODE FOR CARRYING OUT THE INVENTION

Example 1

First, a network tetrafluoroethylene drawn film (POREFLON by Sumitomo Electric Industries, Ltd., 0.2 μm in pore size, 80% in porosity and 40 μm in film thickness) was hydrophilized in a polyacrylic acid aqueous solution by a electron beam irradiation treatment, whereby the network was converted into a porous film. Then, this porous tetrafluoroethylene drawn film was employed to filter a 5% dilute solution of ethylene-vinyl acetate copolymer dispersion (CHEMIPEARL by Mitsui Petrochemical Industries, Ltd.). The filtering with the porous tetrafluoroethylene drawn film was continued until the porous film carried ethylene-vinyl acetate copolymer particles at a weight rate of 50 mg/m$^2$, and thereafter the film carrying the particles was dried to prepare a battery diaphragm.

Figure 1:
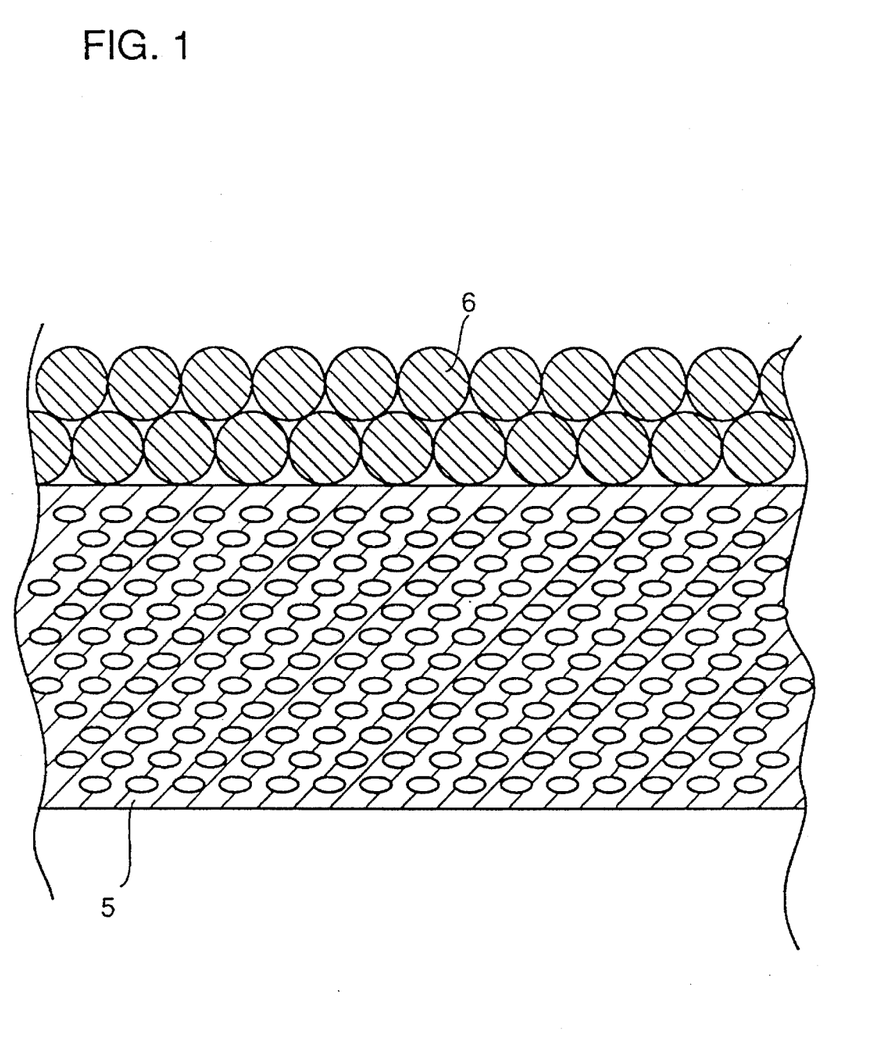
FIG. 1 is a sectional view showing a schematic structure of a battery diaphragm according to the present invention.

Referring to FIG. 1, the present diaphragm includes a tetrafluoroethylene drawn film 5 and an ethylene-vinyl acetate copolymer dispersion 6 carried on this film 5.

The air permeability of the battery diaphragm thus obtained was measured. On the assumption of an accident such as an external short circuit, the air permeability was measured after this battery diaphragm was heat treated in a space held to a temperature of 120° by a thermostat. Table 1 shows the results.

Figure 2:
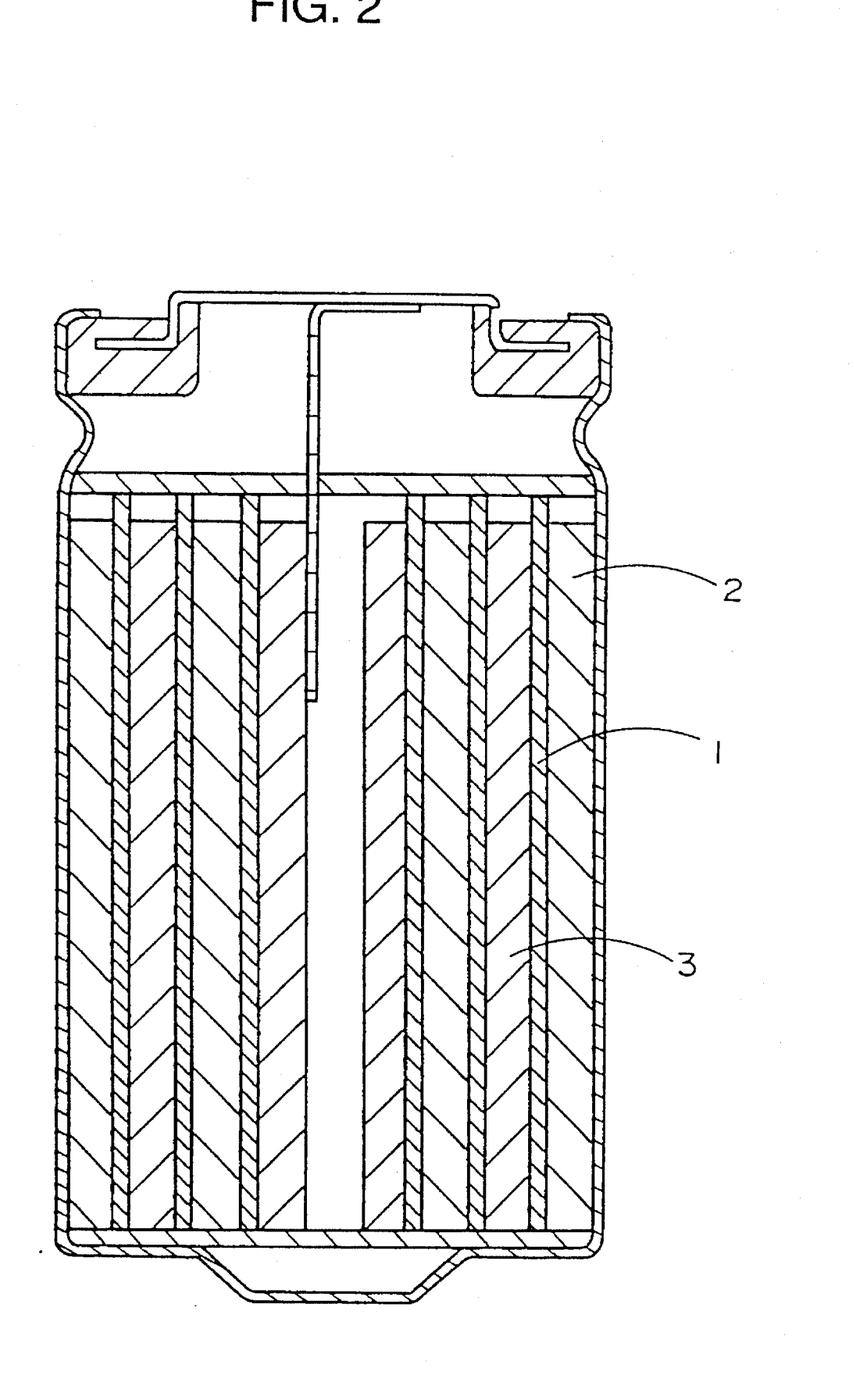
FIG. 2 is a sectional view showing a schematic structure of an example of a battery comprising a positive electrode, a negative electrode and a diaphragm.
Figure 3:
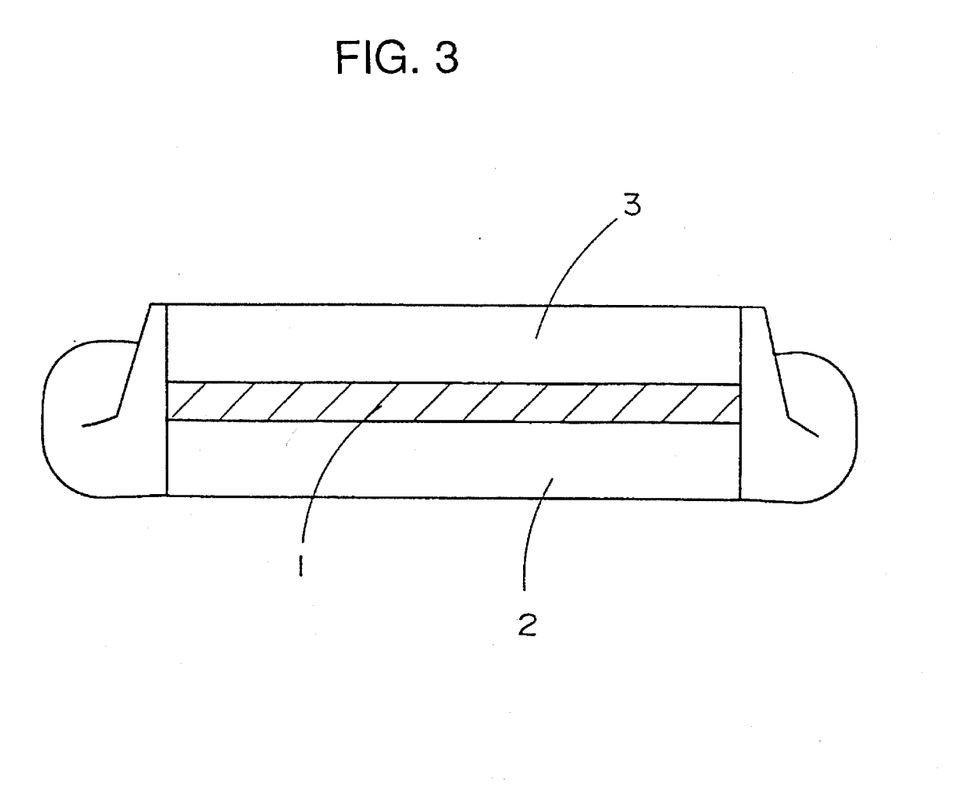
FIG. 3 is a sectional view showing a schematic structure of another example of a battery comprising a positive electrode, a negative electrode and a diaphragm.

As shown in FIG. 2 or FIG. 3, a battery diaphragm 1 not yet heat treated was employed to form a battery having a positive electrode 2 of polyaniline and a negative electrode 3 of an Li—Al alloy. The battery diaphragm 1 was impregnated with 1 mol/l of LiBF$_4$/propylene carbonate as an electrolyte.

The charge or discharge characteristics of this battery were measured in a voltage range of 2.7 to 4.1 V at a current density of 1 mA/cm$^2$. Table 2 shows an internal resistance value and energy efficiency in this case.

Example 2

Ethylene-acrylic acid copolymer dispersion (FLOBEADS by Sumitomo Seika Chemicals Co., Ltd.) was employed to make a network tetrafluoroethylene drawn film (POREFLON by Sumitomo Electric Industries, Ltd.) carrying a layer of ethylene-acrylic acid copolymer particles having a weight rate of 50 mg/m$^2$. The production method was similar to that of Example 1, and thereafter, the film was dried to prepare a battery diaphragm.

The air permeability of the battery diaphragm thus obtained was measured. On the assumption of an accident such as an external short circuit, the air permeability was measured after this battery diaphragm was heat treated in a space maintained at a temperature of 120° C. by a thermostat. Table 1 shows the results.

Further, a battery diaphragm not yet heat treated was employed to form a battery similarly to Example 1, and its charge and discharge characteristics were measured. Table 2 shows the internal resistance value and the energy efficiency in this case.

Comparative Example 1

A polyethylene dispersion (CHEMIPEARL by Sumitomo Seika Chemicals Co., Ltd.) was employed to cause a network tetrafluoroethylene drawn film (POREFLON by Sumitomo Electric Industries, Ltd.) to carry 50 mg/m$^2$ of polyethylene particles. The method was similar to that of Example 1. Thereafter the film was dried to prepare a battery diaphragm.

The air permeability of the battery diaphragm thus obtained was measured. On the assumption of an accident such as an external short-circuit, the air permeability was measured after this battery diaphragm was heat treated in a space maintained at a temperature of 120° C. by a thermostat. Table 1 shows the results.

Further, a battery diaphragm not yet heat treated was employed to form a battery similarly to Example 1, and its charge and discharge characteristics were measured. Table 2 shows an internal resistance value and the energy efficiency in this case.

TABLE 1

| Diaphragm | Air Permeability (second) (JIS P8110-1980) | |
| --- | --- | --- |
| | Not Yet Heat Treated | After Heat Treatment |
| Example 1 | 11 | ∞ |
| Example 2 | 11 | ∞ |
| Comparative Example 1 | 12 | 5000 |

∞ = not air permeable

TABLE 2

| Battery | Internal Resistance (Ω) | Energy Efficiency (%) |
| --- | --- | --- |
| Example 1 | 77 | 98 |
| Example 2 | 78 | 97 |
| Comparative Example 1 | 112 | 91 |

Tables 1 and 2 show, if one compares the results of Examples 1 and 2 with the Comparative Examples 1 that the batteries of Example 1 and Example 2 employing the battery diaphragms carrying the particles of low melting point polymers having hydrophilic groups have a lower internal resistance and a higher energy efficiency than the battery of the Comparative Example 1.

Example 3

When the battery of Example 1 was short-circuited, heat generation was reduced and the temperature did not rise further after reaching 80° C.

Example 4

When the battery of Example 2 was short-circuited, heat generation was reduced and the temperature did not rise further after reaching 100° C.

Comparative Example 2

When the battery of Comparative Example 1 was short-circuited, heat generation continued even after the temperature had reached 120° C.

From the results of Example 3, Example 4 and Comparative Example 2 it is understood that a battery employing a battery diaphragm of the invention has excellent safety characteristics, due to a high reliability in blocking the pores in a porous diaphragm film by melting of a low melting point polymer that closes the pores.

Example 5

First, a network tetrafluoroethylene drawn film (PORE-FLON by Sumitomo Electric Industries, Ltd., 0.2 μm in pore size, 80% in porosity and 40 μm in film thickness) was hydrophilized in a polyacrylic acid aqueous solution by an electron beam irradiation treatment, to be converted into a porous film. Then, this porous film was employed to filter an ethylene-α olefin copolymer dispersion (CHEMIPEARL A100 by Mitsui Petrochemical Industries, Ltd.). Thereafter resin solids were vacuum-dried to form a resin powder that was press-molded into a sheet.

The sheet thus obtained was dipped in propylene carbonate (PC), ethylene carbonate (EC), diethyl carbonate (DEC) and 1,2-dimethoxyethane (DME), to carry out a gelation test at 60° C. for 72 hours as an acceleration test to simulate a long term battery life. Table 3 shows the results.

Comparative Example 3

A polyethylene dispersion (CHEMIPEARL by Mitsui Petrochemical Industries, Ltd.) was employed to prepare a sheet by a method similar to that in Example 5, and a gelation test was similarly carried out on the produced sheet. Table 3 shows the results.

TABLE 3

| Resin | PC | EC | DEC | DME |
|---|---|---|---|---|
| Example 5 | ⊙ | ⊙ | o | o |
| Comparative Example 3 | Δ | Δ | x | x |

⊙: weight unchanged
o: weight reduction not more than 5%
Δ: weight reduction not more than 10%
x: weight reduction at least 10%

Table 3 shows that the sheet of Example 5 employing an ethylene copolymer having side chains is superior in its electrolyte resistance compared to the sheet of Comparative Example 3.

Example 6

First, a network tetrafluoroethylene drawn film (PORE-FLON by Sumitomo Electric Industries, Ltd., 0.2 μm in pore size, 80% in porosity and 40 μm in film thickness) was hydrophilized in a polyacrylic acid aqueous solution by an electron beam irradiation treatment, for converting the film into a porous film. The porous film was employed to filter a 5% dilute solution of ethylene-α olefin copolymer dispersion (polyolefin elastomer dispersion) (CHEMIPEARL A100 by Mitsui Petrochemical Industries, Ltd.). The filtering continued until the film carried ethylene-α olefin copolymer (polyolefin elastomer) particles at a weight rate of 50 mg/m$^2$. The film was then dried to prepare a battery diaphragm. The air permeability of the battery diaphragm was measured after simulating a short circuited battery by heating the battery diaphragm in a space maintained at a temperature of 120°. Table 4 shows these results.

As shown in FIGS. 2 or 3, a battery diaphragm 1 not yet heat treated was employed to form a battery having a positive electrode 2 of polyaniline and a negative electrode 3 of an Li—Al alloy. The battery diaphragm 1 was impregnated with 1 mol/l of LiBF$_4$/propylene carbonate as an electrolyte.

After this treatment the battery was held in a space maintained at a temperature of 60° C. by a thermostat for 72 hours. Then the charge and discharge characteristics were measured in a voltage range of 2.7 to 4.1 V at a current density of 1 mA/cm$^2$. Table 5 shows an internal resistance value and the energy efficiency in this case.

Comparative Example 4

A network tetrafluoroethylene drawn film (POREFLON by Sumitomo Electric Industries, Ltd.) was made to carry a weight rate of 50 mg/m$^2$ of polyethylene particles by filtering a polyethylene dispersion (CHEMIPEARL M200 by Mitsui Petrochemical Industries, Ltd.) in a filtering method similar to that of Example 6. The film was then dried to prepare a battery diaphragm.

The air permeability of the battery diaphragm was measured. An accident or rather an externally short-circuited battery was simulated by heat treating the diaphragm in a space maintained at a temperature of 120° C. by a thermostat. The air permeability was measured after the heat treatment. Table 4 shows these results.

Further, a battery diaphragm not yet heat treated was employed to form a battery similarly to Example 6. After this battery was held at a constant temperature of 60° C. for 72 hours, the charge and discharge characteristics were similarly measured. Table 5 shows an internal resistance value and the energy efficiency in this case.

TABLE 4

| | Air Permeability (sec.) | |
|---|---|---|
| Diaphragm | Not Yet Heat Treated | After Heat Treatment |
| Example 6 | 11 | ∞ |
| Comparative Example 7 | 12 | 5000 |

TABLE 5

| Battery | Internal Resistance (Ω) | Energy Efficiency (%) |
|---|---|---|
| Example 6 | 77 | 98 |
| Comparative Example 4 | 132 | 81 |

Comparing Tables 4 and 5, it is clear that the battery of Example 6 has a low internal resistance and a high energy efficiency even after the heat treatment test that simulates the useful life of the battery, as compared with the battery of Comparative Example 4.

Example 7

When the battery of Example 6 was short circuited, heat generation was reduced and the temperature did not rise any more after reaching 85° C.

Comparative Example 5

When the battery of Comparative Example 4 was short circuited, the temperature was not reduced for 10 minutes after reaching 120° C.

From the results of Example 7 and Comparative Example 5, it is understood that only the battery carrying particles of an ethylene copolymer having side chains maintains a superior safety characteristic by an excellent electrolyte resistance after a heat treatment test simulating a battery life.

Example 8

First, a network tetrafluoroethylene drawn film PORE-FLON registered trademark by Sumitomo Electric Industries, Ltd., 0.1 μm in pore size, 80% in porosity and 25 μm in film thickness was hydrophilized in a polyvinyl alcohol aqueous solution by an electron beam irradiation treatment, to prepare a porous film. Then, this porous film was coated with ethylene-acrylic acid copolymer dispersion (FLO-BEADS (registered trademark) EA209 by Sumitomo Seika Chemicals Co., Ltd.) and thereafter dried, to prepare a battery diaphragm. The thickness of the diaphragm as dried was 35 μm.

Example 9

Figure 4:
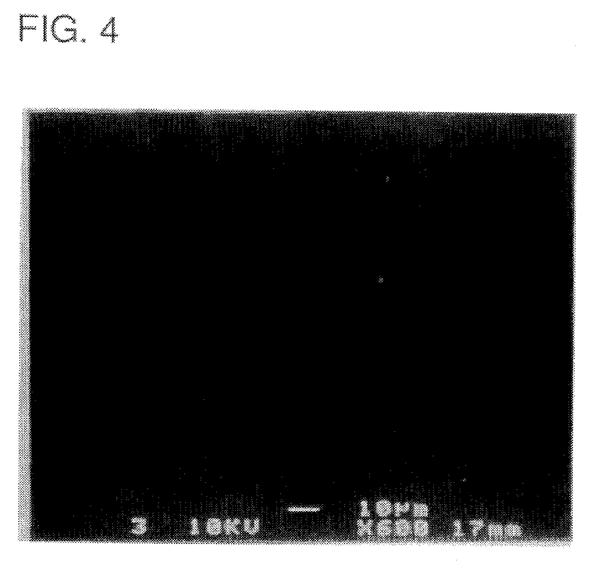
FIG. 4 is a photograph taken with an electron microscope showing a battery diaphragm according to Example 9 of the invention which was heated at 180° C. for 10 minutes.

In place of an ethylene-acrylic acid copolymer dispersion, an ethylene-α olefin copolymer dispersion (polyolefin elastomer dispersion) (CHEMIPEARL (registered trademark) A100 by Mitsui Petrochemical Industries, Ltd.) was employed to prepare a battery diaphragm similarly to Example 8. Other conditions were the same as those of Example 8, and hence description thereof is omitted. As shown in FIG. 4, example 9 has a very smooth surface after heat treatment.

Example 10

First, a network tetrafluoroethylene drawn film (PORE-FLON (registered trademark) by Sumitomo Electric Industries, Ltd., 0.1 μm in pore size, 80% in porosity and 25 μm in film thickness) was dipped in a 1% water and propyl alcohol mixed solution of a copolymer of polyethylene and polyvinyl alcohol (EVAL EP-F by Kuraray Co., Ltd.). Then, the dipped film was dried at room temperature to form a hydrophilic resin layer, thereby hydrophilizing the porous film. Thereafter the hydrophilized porous film was coated with an ethylene-acrylic acid copolymer and thereafter dried similarly to Example 8, to prepare a battery diaphragm. The thickness of the dried diaphragm was 35 μm.

Example 11

First, a network tetrafluoroethylene drawn film (PORE-FLON (registered trademark) by Sumitomo Electric Industries, Ltd., 0.1 μm in pore size, 80% in porosity and 25 μm in film thickness) was hydrophilized in a polyvinyl alcohol aqueous solution by an electron beam irradiation treatment, to prepare a porous film. Then, this porous film was coated with a mixture of ethylene-α olefin copolymer dispersion (polyolefin elastomer dispersion) (CHEMIPEARL (registered trademark) A100 by Mitsui Petrochemical Industries, Ltd.) and a modified polypropylene dispersion ((registered trademark) UNISTOLE R100K by Mitsui Petrochemical Industries, Ltd.), and thereafter dried to prepare a battery diaphragm. The thickness of the dried diaphragm was 35 μm. Further, the mixture contained the ethylene-α olefin copolymer and the modified polypropylene at a rate of 3:7 in a solid weight ratio.

Example 12

First, a network tetrafluoroethylene drawn film (PORE-FLON (registered trademark) by Sumitomo Electric Industries, Ltd., 0.1 μm in pore size, 80% in porosity and 25 μm in film thickness) was hydrophilized in a polyvinyl alcohol aqueous solution by an electron beam irradiation treatment, to prepare a porous film. Then, this porous film was coated with a mixture of ethylene-α olefin copolymer dispersion (CHEMIPEARL (registered trademark) A100 by Mitsui Petrochemical Industries, Ltd.) and a dicumyl peroxide ((registered trademark) PERCUMYL D by Nippon Oil and Fats Co., Ltd.). The coated film was then dried to prepare a battery diaphragm. The thickness of the dried diaphragm was 35 μm.

Example 13

An ethylene-α olefin copolymer dispersion, an epoxy resin dispersion ((registered trademark) AQUATOHTO 3540 by TOHTO KASEI CO., LTD.) and a 2-heptadecyl imidazole ((registered trademark) C17Z by Shikoku Chemicals Corporation) for hardening epoxy resin, were employed to prepare a battery diaphragm similarly to Example 12. The other conditions were the same as those of Example 12, and hence description thereof is omitted.

Comparative Example 6

Polyethylene dispersion (CHEMIPEARL (registered trademark) M200 by Mitsui Petrochemical Industries, Ltd.) was employed instead of ethylene-acrylic acid copolymer dispersion, to prepare a battery diaphragm which was similar to Example 8. The other conditions were the same as those of Example 8, and hence description thereof is omitted.

Comparative Example 7

A network tetrafluoroethylene drawn film (POREFLON (registered trademark) by Sumitomo Electric Industries, Ltd., 0.1 μm in pore size, 80% in porosity and 25 μm in film thickness) which was not hydrophilized was employed to carry ethylene-acrylic acid copolymer particles similarly to Example 8, to prepare a battery diaphragm. The other conditions were the same to those of Example 8, and hence description thereof is omitted.

Comparative Example 8

A network tetrafluoroethylene drawn film (POREFLON (registered trademark) by Sumitomo Electric Industries, Ltd., 0.1 μm in pore size, 80% in porosity and 25 μm in film thickness) which was not hydrophilized was employed to carry ethylene-α olefin copolymer particles similarly to Example 9, to prepare a battery diaphragm. The other conditions were the same as those of Example 9, and hence description thereof is omitted.

Comparative Example 9

A polypropylene porous film (CELGARD (registered trademark) 2400 by HOECHST CELANESE CO., LTD., 25 μm in thickness, 0.05 μm in pore size and 38% in porosity) was converted to a battery diaphragm.

The battery diaphragms of Examples 8 to 13 and of Comparative Examples 6 to 9 prepared as described above were employed to produce batteries, and the boosting charge and discharge characteristics, the useful battery life characteristics, safety characteristics with respect to overcharges and external short-circuits were examined. The results are now described.

Example 14

The battery diaphragm of Example 8 was employed to form a battery having a positive electrode of polyaniline, a negative electrode of an Li—Al alloy and an electrolyte of 1 mol/l of $LiBF_4$/propylene carbonate.

Example 15

The battery diaphragm of Example 9 was employed in a battery similarly to Example 14.

Comparative Example 10

The battery diaphragm of Comparative Example 9 was employed in a battery similarly to Example 14.

The batteries of Examples 14 and 15 were compared with the battery of Comparative Example 10 by measuring respectively the boosting charge and discharge characteristics in a voltage range of 2.7 to 4.1 V at a current density of 5 mA/cm$^2$. Table 6 shows the discharge times in this case.

TABLE 6

| Battery | Diaphragm | Discharge Time (min.) |
|---|---|---|
| Example 14 | Example 8 | 11.8 |
| Example 15 | Example 9 | 11.9 |
| Comparative Example 10 | Comparative Example 9 | 4.3 |

Table 6 shows that the batteries of Example 14 and Example 15 have battery characteristics withstanding severe use with low internal resistance values and long discharge times following a boosting, as compared with the battery of Comparative Example 10.

Example 16

The battery diaphragm of Example 8 was employed to prepare an SC size lithium ion battery having a positive electrode of $LiCoO_2$, a negative electrode of carbon and an electrolyte prepared by dissolving $LiPF_6$ in a 1:1 mixed solution of ethylene carbonate and diethylene carbonate.

Example 17

The battery diaphragm of Example 9 was employed in a lithium ion battery similarly to Example 16.

Example 18

The battery diaphragm of Example 10 was employed in a lithium ion battery similarly to Example 16.

Example 19

The battery diaphragm of Example 11 was employed in a lithium ion battery similarly to Example 16.

Example 20

The battery diaphragm of Example 12 was employed in a lithium ion battery similarly to Example 16.

Example 21

The battery diaphragm of Example 13 was employed in a lithium ion battery similarly to Example 16.

Comparative Example 11

The battery diaphragm of Comparative Example 6 was employed in a lithium ion battery similarly to Example 16.

Comparative Example 12

The battery diaphragm of Comparative Example 7 was employed in a lithium ion battery similarly to Example 16.

Comparative Example 13

The battery diaphragm of Comparative Example 8 was employed in a lithium ion battery similarly to Example 16.

Comparative Example 14

The battery diaphragm of comparative example 9 was employed in a lithium ion battery similarly to Example 16.

The battery life characteristics of the lithium ion batteries of Examples 16 to 21 and Comparative Examples 11 to 14 were examined as follows:

First, a cycle test of charging each lithium ion battery to reach 4.1 V at a current density of 0.4 mA/cm$^2$ at the electrode area and thereafter discharging the same to 2.7 V at the same current density, was carried out and the capacity was measured at the third cycle. Then, the batteries were held at a constant temperature of 60° C. for 1 month, and thereafter the capacity was again measured by similar charge and discharge cycles. Table 7 shows battery capacities of the respective batteries before and after the battery life test.

TABLE 7

| Battery | Diaphragm | Initial Capacity (mAh) | Preservation Capacity (mAh) |
|---|---|---|---|
| Example 16 | Example 8 | 710 | 705 |
| Example 17 | Example 9 | 715 | 706 |
| Example 18 | Example 10 | 712 | 710 |
| Comparative Example 11 | Comparative Example 6 | 713 | 651 |

As shown in Table 7, the batteries of Examples 16 to 18 employing the battery diaphragms of Examples 8 to 10 in which particles of ethylene copolymers containing side chains were carried on hydrophilized polymer porous bodies, did not show any significant capacity deterioration in the aforementioned preservation test. On the other hand, the battery of Comparative Example 11 employing the diaphragm of Comparative Example 6 showed a capacity loss from 713 mAh to 651 mAh.

The battery diaphragms of Examples 8 and 9 and of Comparative Example 6 were tested in an acceleration test simulating battery life as follows:

First, respective particles of the ethylene-acrylic acid copolymer, the ethylene-α olefin copolymer and polyethylene were taken out from the diaphragms of Examples 8 and 9 and comparative example 6, and pressed into the form of pellets. Then, these pellets were dipped in propylene carbonate (PC), ethylene carbonate (EC), diethyl carbonate (DEC) and 1,2-dimethyoxyethane (DME) at 70° C. for 72 hours, to carry out a gelation test. Table 8 shows the results.

TABLE 8

|  | PC | EC | DEC | DME |
|---|---|---|---|---|
| Ethylene-Acrylic Acid Copolymer | ⊚ | ⊚ | o | o |
| Ethylene-α Olefin Copolymer | ⊚ | ⊚ | o | o |
| Polyethylene | o | o | Δ | x |

⊚: weight unchanged
o: weight reduction not more than 5%
Δ: weight reduction not more than 10%
x: weight reduction at least 10%

Table 8 shows that the ethylene-acrylic acid copolymer and the ethylene-α olefin copolymer have a superior electrolyte resistance compared to polyethylene.

Then, the safety characteristics of each lithium ion battery with respect to an overcharge, were examined as follows:

The lithium ion batteries of Examples 16 to 21 and comparative examples 11 and 14 employing the diaphragms of Examples 8 to 13 and Comparative Examples 6 and 9 were subjected to an overcharge test by charging the batteries at 1.4 A respectively. Table 9 shows the results. Batteries in which the temperatures reached 170° C. at least once are shown with marks X, and batteries not reaching 170° C. are shown with marks O.

TABLE 9

| Battery | Diaphragm | Result of Overcharge Test |
|---|---|---|
| Example 16 | Example 8 | o |
| Example 17 | Example 9 | o |
| Example 18 | Example 10 | o |
| Example 19 | Example 11 | o |
| Example 20 | Example 12 | o |
| Example 21 | Example 13 | o |
| Comparative Example 11 | Comparative Example 6 | x |
| Comparative Example 14 | Comparative Example 9 | x |

Table 9 shows that the diaphragms of Examples 8 to 13 are insulated due to heating by overcharges to ensure the safety of the batteries with respect to an overcharge, while such functions are insufficient in the diaphragms of Comparative Examples 6 and 9.

Then, an external short-circuit test was carried on the lithium ion batteries of Examples 16 to 21 and Comparative Examples 11 to 14 employing the diaphragms of Examples 8 to 13 and Comparative Examples 6 to 9.

As the result, a current of about 20 A was flowing immediately after a short-circuit and the internal temperature of the battery reached about 180° C. after 1 minute following a short circuit in each battery. However, the batteries of Examples 16 to 21 employing the diaphragms of Examples 8 to 13 were thereafter monotonously cooled and no abnormality was observed in these batteries. In the batteries of Comparative Examples 11 to 14 employing the diaphragms of Comparative Examples 6 to 9, however, the internal temperatures of the batteries were cooled once after the first temperature increase but repeated temperature increases and decreases were observed. In particular, the batteries of comparative examples 12, 13 and 14 caused electrolyte leakage.

Then, the diaphragms of Example 9 and Comparative Examples 6 and 8 were heated to a constant temperature of 180° C. and maintained at that temperature for 10 minutes and then cooled. Thereafter an air permeability measurement and an electron microscope observation were performed. Table 10 shows the results of the air permeability measurement, and FIGS. 4 to 6 show the results of the electron microscope observation.

TABLE 10

| Diaphragm | Air Permeability (JIS P8110-1980) |
|---|---|
| Example 9 | ∞ = not permeable |
| Comparative Example 6 | 1000 |
| Comparative Example 8 | 5000 |

Figure 5:
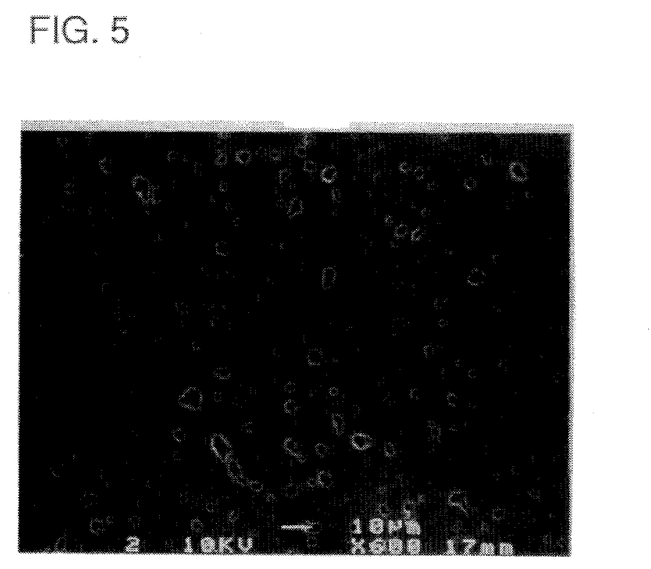
FIG. 5 is a photograph taken with an electron microscope showing a battery diaphragm according to comparative Example 6 which was heated at 180° C. for 10 minutes.
Figure 6:
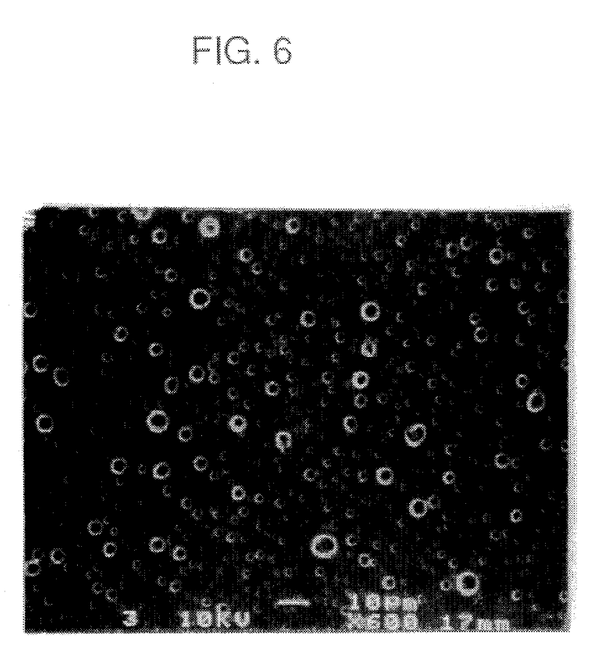
FIG. 6 is a photograph by an electron microscope showing a battery diaphragm according to comparative example 8 which was heated at 180° C. for 10 minutes.

Table 10 and FIGS. 4 to 6 show the following. The pores of the polymer porous body of Example 9 were completely blocked as shown by the black surface in FIG. 4 relating to the battery of Example 17. On the other hand, the closure of the pores of the polymer porous body of Comparative Example 6 is incomplete in the diaphragms as shown by the light rings in FIG. 5. Similarly, the pores of the porous body of Comparative Example 8 were incompletely blocked as shown by the light rings in FIG. 6. The diaphragms of Comparative Examples 6 and 8 were employed in the batteries of Comparative Examples 11 and 13.

Industrial Availability

As hereinabove described, the battery diaphragm and the battery according to the present invention can prevent a phenomenon such as leakage of an electrolyte to exhibit excellent safety in an abnormal state of temperature rise caused by an external short or the like, by making a function for serving as a battery lost.

We claim:

1. A battery diaphragm comprising a hydrophilized polymer porous body (5) having pores therein and ethylene copolymer particles (6) having side chains, carried on said porous body, said particles (6) having a melting point within the range of 80° to 170° C.

2. The battery diaphragm of claim 1, wherein said particles (6) have a particle size in excess of the size of said pores of said hydrophilized polymer porous body (5), and wherein said particles (6) form a layer carried on said hydrophilized polymer porous body (5), said layer having a thickness of at least 5 μm.

3. The battery diaphragm of claim 1, wherein said pores of said hydrophilized polymer porous body (5) have a pore size of at least 0.01 μm.

4. The battery diaphragm of claim 3, wherein said hydrophilized polymer porous body (5) is obtained by hydrophilizing a polymer porous body in a polyacrylic acid aqueous solution by an electron beam irradiation treatment.

5. The battery diaphragm of claim 3, wherein said hydrophilized polymer porous body (5) is obtained by hydrophilizing a polymer porous body in a polyvinyl alcohol aqueous solution by an electron beam irradiation treatment.

6. The battery diaphragm of claim 3, wherein said hydrophilized polymer porous body (5) is obtained by dipping a polymer porous body into a mixed solution of a copolymer of polyethylene and polyvinyl alcohol.

7. The battery diaphragm of claim 1, wherein said ethylene copolymer is an ethylene-acrylic acid copolymer.

8. The battery diaphragm of claim 1, wherein said ethylene copolymer is an ethylene-α olefin copolymer.

9. The battery diaphragm of claim 1, wherein said hydrophilized polymer porous body (5) is a tetrafluoroethylene drawn film.

10. The battery diaphragm of claim 1, further comprising a bridgeable compound on said polymer particles (6), between said polymer particles (6), or in said polymer particles (6).

11. The battery diaphragm of claim 10, wherein said bridgeable compound is a peroxide compound.

12. The battery diaphragm of claim 10, wherein said bridgeable compound is epoxy resin and a curing agent for hardening said epoxy resin.

13. The battery diaphragm of claim 1, wherein said hydrophilized polymer porous body (5) is obtained by fixing a hydrophilic high polymer to said porous film by graft polymerization or coating.

14. The battery diaphragm of claim 13, wherein said hydrophilized polymer porous body (5) is obtained by hydrophilizing a polymer porous body in a polyacrylic acid aqueous solution by an electron beam irradiation treatment.

15. The battery diaphragm of claim 13, wherein said hydrophilized polymer porous body (5) is obtained by hydrophilizing a polymer porous body in a polyvinyl alcohol aqueous solution by an electron beam irradiation treatment.

16. The battery diaphragm of claim 13, wherein said hydrophilized polymer porous body (5) is obtained by dipping a polymer porous body into a mixed solution of a copolymer of polyethylene and polyvinyl alcohol.

17. The battery diaphragm of claim 1, wherein said hydrophilized polymer porous body (5) is obtained by hydrophilizing a polymer porous body in a polyacrylic acid aqueous solution by an electron beam irradiation treatment.

18. The battery diaphragm of claim 1, wherein said hydrophilized polymer porous body (5) is obtained by hydrophilizing a polymer porous body in a polyvinyl alcohol aqueous solution by an electron beam irradiation treatment.

19. The battery diaphragm of claim 1, wherein said hydrophilized polymer porous body (5) is obtained by dipping a polymer porous body into a mixed solution of a copolymer of polyethylene and polyvinyl alcohol.

20. A battery diaphragm comprising a hydrophilized tetrafluoroethylene drawn film (5), and ethylene-acrylic acid copolymer particles (6) carried on said film (5).

21. The battery diaphragm of claim 20, further comprising a bridgeable compound on said polymer particles (6), between said polymer particles (6), or in said polymer particles (6).

22. The battery diaphragm of claim 20, wherein said hydrophilized polymer porous body (5) is obtained by hydrophilizing a polymer porous body in a polyacrylic acid aqueous solution by an electron beam irradiation treatment.

23. The battery diaphragm of claim 20, wherein said hydrophilized polymer porous body (5) is obtained by hydrophilizing a polymer porous body in a polyvinyl alcohol aqueous solution by an electron beam irradiation treatment.

24. The battery diaphragm of claim 20, wherein said hydrophilized polymer porous body (5) is obtained by dipping a polymer porous body into a mixed solution of a copolymer of polyethylene and polyvinyl alcohol.

25. A battery diaphragm comprising a hydrophilized tetrafluoroethylene drawn film (5), and ethylene-α olefin copolymer particles (6) carried on said film (5).

26. The battery diaphragm of claim 25, further comprising a bridgeable compound on said polymer particles (6), between said polymer particles (6), or in said polymer particles (6).

27. The battery diaphragm of claim 25, wherein said hydrophilized polymer porous body (5) is obtained by hydrophilizing a polymer porous body in a polyacrylic acid aqueous solution by an electron beam irradiation treatment.

28. The battery diaphragm of claim 25, wherein said hydrophilized polymer porous body (5) is obtained by hydrophilizing a polymer porous body in a polyvinyl alcohol aqueous solution by an electron beam irradiation treatment.

29. The battery diaphragm of claim 25, wherein said hydrophilized polymer porous body (5) is obtained by dipping a polymer porous body into a mixed solution of a copolymer of polyethylene and polyvinyl alcohol.

30. A battery comprising a positive electrode (2), a negative electrode (3) and a diaphragm (1), said diaphragm (1) comprising a hydrophilized tetrafluoroethylene drawn film (5); and ethylene-acrylic acid copolymer particles (6) carried on said film (5).

31. The battery of claim 30, wherein said hydrophilized tetrafluoroethylene drawn film (5) is obtained by hydrophilizing a tetrafluoroethylene drawn film in a polyacrylic acid aqueous solution by an electron beam irradiation treatment.

32. The battery of claim 30, wherein said hydrophilized tetrafluoroethylene drawn film (5) is obtained by hydrophilizing a tetrafluoroethylene drawn film in a polyvinyl alcohol aqueous solution by an electron beam irradiation treatment.

33. The battery of claim 30, wherein said hydrophilized tetrafluoroethylene drawn film (5) is obtained by dipping a tetrafluoroethylene drawn film into a mixed solution of a copolymer of polyethylene and polyvinyl alcohol.

34. A battery comprising a positive electrode (2), a negative electrode (3) and a diaphragm (1), said diaphragm (1) comprising a hydrophilized tetrafluoroethylene drawn film (5); and ethylene-α olefin copolymer particles (6) carried on said film (5).

35. The battery of claim 34, wherein said hydrophilized tetrafluoroethylene drawn film (5) is obtained by hydrophilizing a tetrafluoroethylene drawn film in a polyacrylic acid aqueous solution by an electron beam irradiation treatment.

36. The battery of claim 34, wherein said hydrophilized tetrafluoroethylene drawn film (5) is obtained by hydrophilizing a tetrafluoroethylene drawn film in a polyvinyl alcohol aqueous solution by an electron beam irradiation treatment.

37. The battery of claim 34, wherein said hydrophilized tetrafluoroethylene drawn film (5) is obtained by dipping a tetrafluoroethylene drawn film into a mixed solution of a copolymer of polyethylene and polyvinyl alcohol.

* * * * *

UNITED STATES PATENT AND TRADEMARK OFFICE
CERTIFICATE OF CORRECTION

PATENT NO. :   5,591,542
DATED      :   January 7, 1997
INVENTOR(S):   Sakamoto et al.

It is certified that error appears in the above-identified patent and that said Letters Patent is hereby corrected as shown below:

Column 5, line 64, delete "by";

Column 8, Table 1, heading 1, replace "(JIS P8110-1980)" by --(JIS P8117-1980)--;

Column 8, line 52, after "groups" insert --,--;

Column 16, Table 10, heading 2, replace "(JIS P8110-1980)" by --(JIS P8117-1980)--;

Signed and Sealed this

Third Day of June, 1997

Attest:

BRUCE LEHMAN

Attesting Officer

Commissioner of Patents and Trademarks